Figure 3:
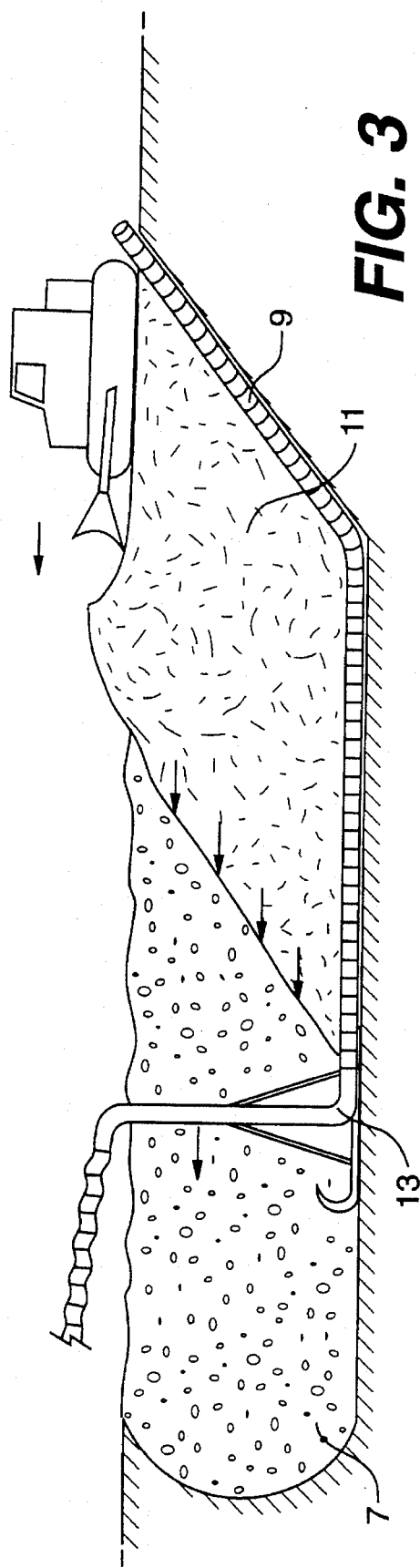

United States Patent [19]

Tallard

[11] Patent Number: 5,611,643

[45] Date of Patent: Mar. 18, 1997

[54] PROCESS FOR THE CONSTRUCTION OF TRENCHES

[75] Inventor: Gilbert R. Tallard, Pelham, N.Y.

[73] Assignee: Envirotrench, Pelham, N.Y.

[21] Appl. No.: 513,548

[22] Filed: Aug. 10, 1995

[51] Int. Cl.⁶ .............................. E02D 17/12; F16L 57/00
[52] U.S. Cl. ..................... 405/157; 405/282; 405/154; 405/179
[58] Field of Search ..................... 405/154, 156, 405/157, 174, 179, 267, 282

[56] References Cited

U.S. PATENT DOCUMENTS

| 4,329,083 | 5/1982 | Parkinson | 405/154 |
| 4,696,607 | 9/1987 | Ressi di Cervia | 405/179 X |
| 4,863,312 | 9/1989 | Cavalli | 405/157 X |
| 4,877,358 | 10/1989 | Ressi di Cervia | 405/267 |
| 5,065,822 | 11/1991 | Miller et al. | 405/154 X |

FOREIGN PATENT DOCUMENTS 2905146   8/1980   Germany ............................... 405/157

*Primary Examiner*—Stephen J. Novosad
*Assistant Examiner*—Frederick L. Lagman
*Attorney, Agent, or Firm*—Larson & Taylor

[57] ABSTRACT

In the process for the construction of trenches in ground containing water and/or gas wherein a trench is due in said ground, support media is introduced in said trench to support the walls formed by the treching, vapor or water conduit means are placed in the trench and the trench with this support media is back-filled with particular material to dispose and remove the support media from the trench, the improvement comprising employing as said support media a hydrated cross linked acrylic polymer.

5 Claims, 2 Drawing Sheets

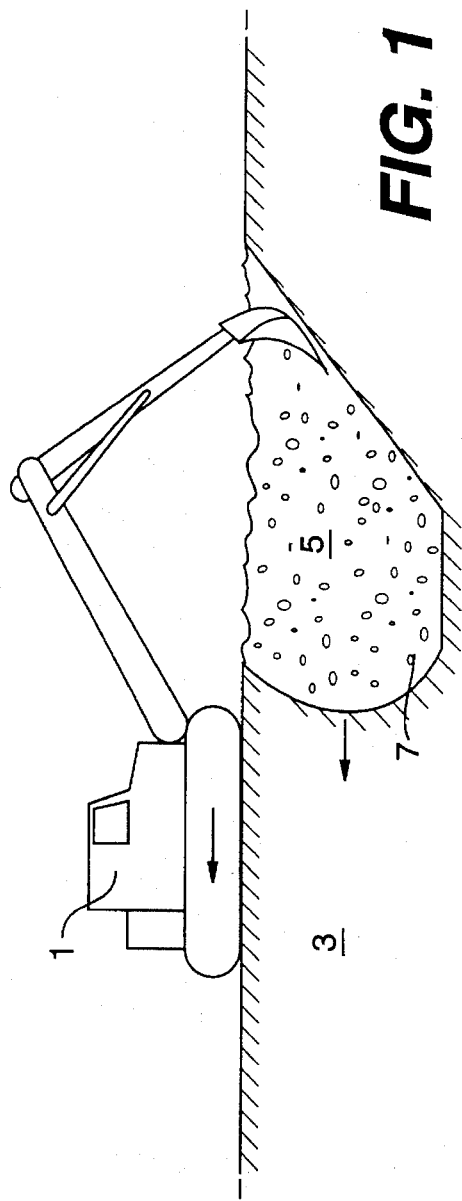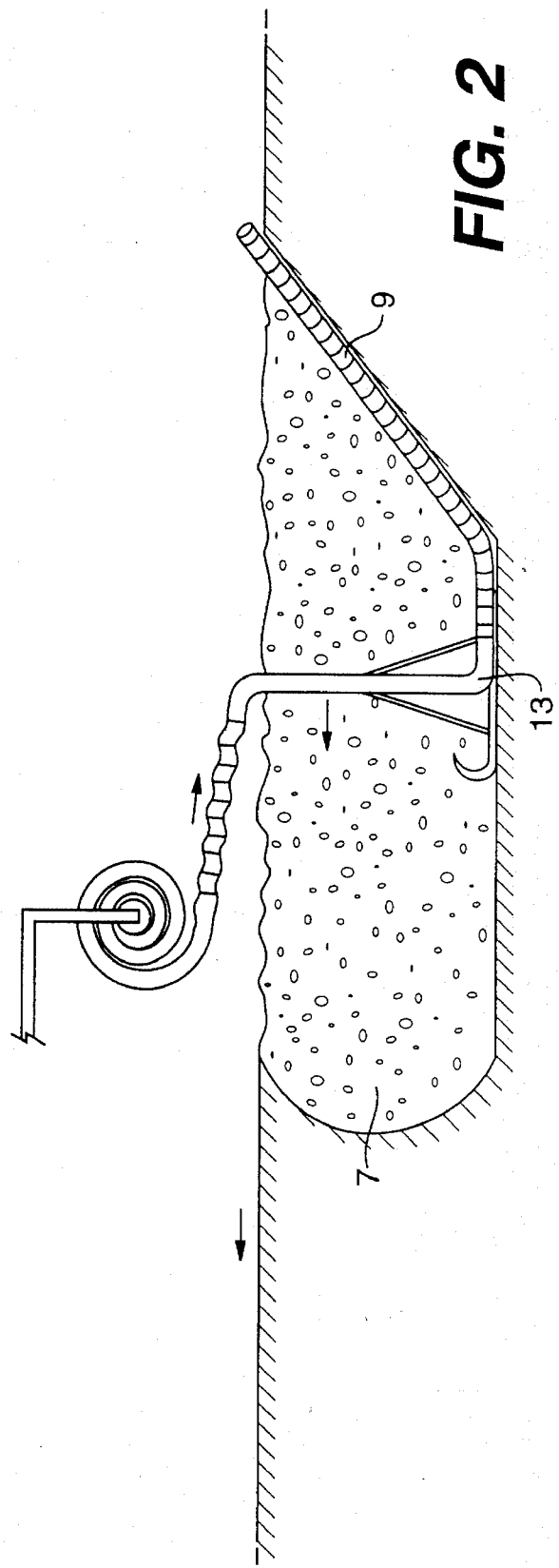

PROCESS FOR THE CONSTRUCTION OF TRENCHES

BACKGROUND OF THE INVENTION

This invention relates to an improved process for the construction of trenches in ground containing vapor and/or water. More particularly, the invention relates to the use of a certain polymer material as the support media introduced during the trenching to support the trench walls formed.

The ability to excavate the earth in the form of narrow trenches with the sole support of a liquid slurry akin to a drilling mud is now common practice for different kinds of constructions such as reinforced diaphragm walls, soldier beam tremie concrete walls, soil bentonite slurry trenches of self-hardening slurry trenches, either for structural or for ground water control applications, respectively. A more recent development is the use of natural and synthetic polymer slurries in the trenching of deep collection drains. Although the first application was for draining ground water causing slope instability, the present applications are confined to the extraction of contaminated groundwater or decomposition gases such as methane. In situ bioremediation can also use polymer slurry trenched drains for extraction and reinjection of treatment fluids. A new application consists in combining conventional slurry trenched barrier with polymer slurry trenched drain segments filled with reactive particulates to channel contaminated ground water through these "gates" and provide in situ treatment "on the run".

Typically, trenching under slurry causes some soil particles to become suspended. In traditional thixotropic clay slurries, most of the fines remain suspended when the slurry comes at rest. On the contrary, for almost all polymer slurries used in the trenching process, fines are only temporarily in suspension while the slurry is agitated but, when at rest, all fines will ultimately settle. This creates two types of problems in the construction of polymer slurry trenched drains. The suspended fines will combine with the polymer in forming a filter cake on the pervious sides of the trench. Theses fines will have to be removed from the soil/filter sand/gravel backfill interface to reestablish the natural conductivity of the ground. The fines that will have to settle into a sludge at the bottom of the trench within the lapse of time between trenching and backfilling need to be removed to permit the placement of a drain pipe and of the granular backfill in clean conditions. If not, the granular backfill filter comes, in this critical lower stage, saturated with the sludge. Once installation is complete, both situations require a serious cleaning effort during the drain development which is quite similar to that of a water well. The fact that these techniques are done "in the blind" is conducive to difficult control and open to poor practices leading to mediocre performance. This result is often masked by the fact that the extraction flow rate required by the treatment plant is often a fraction of the drains hydraulic yield potential.

Since trenching processes using polymer slurry as the support media for the walls formed by the trenching carries serious drawbacks as described above, there is a need for the materials other than polymer slurries that provide proper support and performances.

OBJECTS OF THE INVENTION

It is the object of the invention to provide a trench construction process that prevents the suspension of fines and the smearing of the trench walls with caked materials.

Another object of the invention is to provide a trench construction process that avoids the formation of a sludge deposit at the bottom of the trench.

Yet another object of the invention is to provide a trench construction process that makes it physically impossible for the granular backfill filter to be plugged with fines.

A further object of the invention is to provide a trench construction process that provides hydrostatic trench wall support characteristics equal to or better than that provided by polymer slurries without the undesirable characteristics associated with the polymer slurries.

Lastly, it is an object of the invention to provide a trench construction process that is cleaner, faster and more economical that prior art processes.

SUMMARY OF THE INVENTION

These and other objectives of the invention are provided by an improvement to a process for the construction of trenches in ground containing water and/or gas wherein a trench is dug in said ground, support media is introduced in said trench to support the walls formed by the trenching, vapor or water conduit means are optionally placed in the trench and the trench with the support media is back-filled with particulate material to displace and remove the support media from the trench. The improvement in this process according to the invention comprises employing as said support media a hydrated crosslinked acrylic copolymer. The copolymer is preferably fully hydrated and full hydration can be achieved by immersing the copolymer in water for 3 to 6 hours. Once fully hydrated, the resulting mass is best stored in draining containers to minimize the residual moisture. As such, the hydrated polymer material is pumpable with a positive displacement pump such as a diaphragm or progressive cavity type pump. However, since the hydrated polymer behaves essentially like a solid, it can be easily handled as by a clamshell or any other earthmoving equipment.

In general, the trenching process of the invention comprises excavating in vapor—or water—bearing soils, a narrow trench (12 to 48 inches wide) using a suitable excavator such as a back hoe type excavator bucket, a hanging grab bucket or similar excavation equipment. In order to provide support, each volume of soil removed by the excavator is replaced immediately by an equal volume of the hydrated polymer. The trenching process is normally continuous, moving linearly once the trench excavation has reached its designated depth. Given the gel nature of the hydrated polymer, its angle of repose is very low; this confers a certain flowability which allows, at all times, the hydrated polymer to fill the cavity created by the excavator. Having a specific gravity equal to that of water, the hydrated polymer will oppose ground water pore pressure when the top of the trench elevation is a number of feet above the ground water table elevation, thus providing a positive hydrostatic pressure against the vertical trench walls. The higher the difference in elevation between the top of the trench and the ground water table, the more stable the trench excavation. The level of the top of the copolymer in the trench is as close as possible to ground level while minimizing spillage. The hydrated material under its own weight, acts as one continuous gel mass, hence blocking ground water inflow into the trench. In order to assure that no liquid phase is formed in the trench, a certain amount of dry granules of the hydrated polymer may be sprinkled directly over the trench to mop up an unabsorbed water phase. The hydrated polymer may be pumped into the trench or may be dumped or pushed by earthmoving equipment. Once the trench has reached its designated depth and the backfill operation is underway, matching the rate of excavation, the volume of the copolymer in the trench remains constant with the exception of the polymer contained in the excavation tool and disposed as part of the excavated materials. Only makeup hydrated polymer is required to maintain a constant level. Trenching under a liquid support media requires the working platform to be almost horizontal (1% maximum on the alignment). In contrast, the hydrated polymer's angle of repose (≈5%) permits trenching along steeper grades.

Since no liquid phase enters the trench when trenching under the hydrated polymer, no sludge or soil fines is present at the bottom of the trench. Hence, no need for cleaning the trench bottom exists and backfilling can follow concurrently. The backfill may be a granular filter material of a proper graduation to serve as an horizontal drain or an impervious mixture, eventually cementitious, eventually reinforced to serve either as a ground water barrier or as a retaining wall. The backfill weight of any backfill material is always much higher than that of the support material; the latter is displaced horizontally and vertically by the backfill. When the end product is intended to be a drain, such as leachate extraction trench, a perforated pipe is installed at the bottom of the trench ahead of the backfill placement using an appropriate plowing device. Upon completion of the backfill material placement, the drain is immediately operational since no development phase is necessary. No disposal of large amounts of fluid is required at the end of the project and only the gel needs to be disposed of. Even when working in contaminated ground water, the fully hydrated polymer remains essentially uncontaminated. The residual hydrated polymer can be washed out and broken down chemically to a harmless water consistency. An alternative solution comprises spreading a residual copolymer to dry after which it will shrink back to its original harmless granular form.

The crosslinked polymers employed as the support media in the present invention are partially crosslinked, water-swellable but water-insoluble acrylic polymers. These partially cross-linked polymers include homopolymer of water-soluble acrylic acid salts, homopolymer of water-soluble methacrylic salts, homopolymer of acrylamide and copolymers of acrylamide and acrylic acid or methacrylic acid salts, partially cross-linked with, for instance, a divinyl or diallyl compound so that the resulting polymer can be swollen with water but will not dissolve in water. The preferred polymers are crosslinked copolymers of acrylamide and sodium acrylate in methacrylate. The resulting massive hydrous gel is dried and pulverized.

In order to ready the resulting crosslinked polymer particles for use in the present invention, the polymer must be subjected to hydration, preferably full hydration. This can be accomplished by immersing the crosslinked polymer particles in water for 3 to 6 hours. The hydration results in the formation of translucent gel nugget of a size that varies according to the milling of the polymer. Typically, the swollen particles size is that of the Pea gravel. This granule size may be varied to match the grain size of the granular backfill and the maximum pore size of the soil to be trenched. The swell in volume will vary between 200 and 300 times the original polymer volume depending on the water quality. A typically proportioning is 0.1 to 0.5% of polymer by weight of water.

The invention will be more readily apparent from the accompanying drawing herein.

Figure 4:
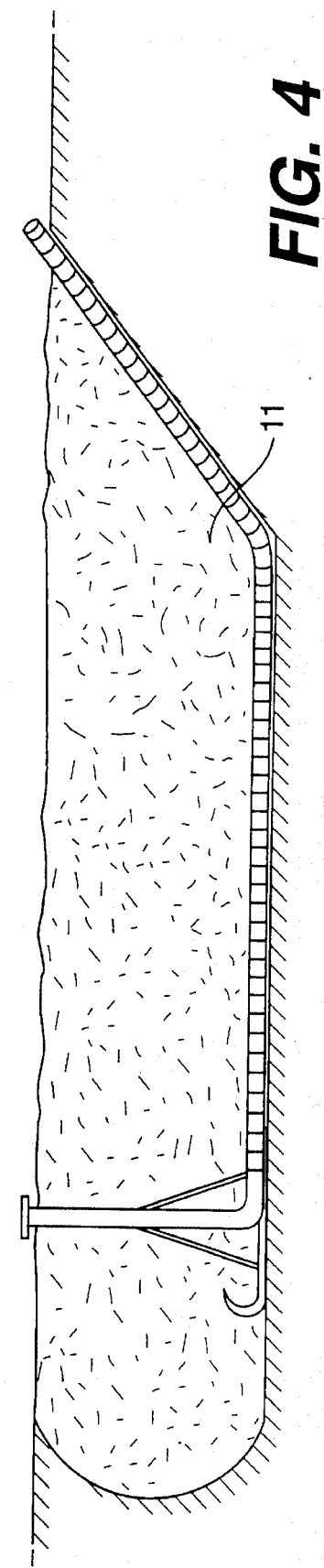

FIG. 1 is a diagrammatic sectional view of the initial stage of the trenching process showing the beginning introduction of the hydrated crosslinked polymer (herein referred to as "polymer gel");

FIG. 2 diagrammatic sectional view of a trenching process showing introduction in the trench of a slotted pipe;

FIG. 3 is a diagrammatic sectional view of the trenching process showing the beginning of the backfill stage; and FIG. 4 is a diagrammatic sectional view of the trenching process after completion of the backfill stage.

With reference to FIG. 1, a hydraulic excavator 1 has started the trenching process in water-bearing soil designated 3 to form a trench 40 inches wide and 4 feet deep. The starter slope is 30°. The excavated are 5 is partially filled [by weight of water] and with hydrated crosslinked particles of polymer gel 7 comprised of a copolymer acrylamide and sodium acrylate. Each particle contains approximately 0.3% polymer of the swollen particle size is substantially the grain size of the back-fill particles subsequently introduced. Introduction of the polymer gel can be effected in any suitable way as by pumping, dumping or pushing with earth-moving equipment. Once the starter trench excavation reaches the desired depth of 4 feet, the trenching process moves linearly. As a result of the nature of the polymer gel and the low angle of repose, the polymer gel flows easily into the cavity until it is filled as near to the tope as possible without spillage.

Referring to FIG. 2, after the trenching/polymer gel filling operation has progressed to full depth for about 50 feet, a slotted drain pipe 9 is installed in the bottom of the trench using any suitable installation equipment such as a pipe installer 13. The back-fill operation with pea gravel then follows as shown in FIG. 3.

The weight of the back-fill material 11 is always heavier than that of the polymer gel and therefore the latter is displaced by the former both horizontally and vertically. The backfill operation continues until the trench is completely filled as shown in FIG. 4. Upon completion of the back-fill placement and the installation of the riser pipe, the drain 9 is immediately operational.

Although in the foregoing description the present invention has been described by references to specific preferred embodiments, it is to understand that modifications and alterations may be achieved within the knowledge of these skilled in the art. For instance, the shape of the excavation instead of being trench-like may be cylindrical such as the drilled caisson or a horizontal bored hole or any other shape that can be excavated.

It is claimed:

1. In the process for the construction of trenches in ground containing water and/or gas wherein a trench is dug in said ground, support media is introduced in said trench to support the walls formed by the trenching, vapor or water conduit means are placed in the trench and the trench with this support media is back-filled with particular material to dispose and remove the support media from the trench, the improvement comprising employing as said support media a hydrated cross linked acrylic polymer.

2. The improvement according to claim 1 wherein the cross linked acrylic polymer is selected from the group consisting of homopolymer of water-soluble acrylic acid salt, homopolymer of water-soluble methacrylic salts, homopolymer of acrylamide and copolymers of acrylamide and acrylic acid or methacrylic acid salts.

3. The improvement according to claim 2 wherein the cross linking is of a divinyl or diallyl compound so that the resulting polymer can be swollen with water but which will not dissolve in water.

4. The improvement according to claim 1 wherein the cross linked acrylic polymer is a copolymer or acrylamide and sodium acrylate or methacrylate.

5. The process for the construction of trenches in ground containing water and/or gas wherein a trench is dug in said ground, support media is introduced in said trench to support the walls formed by the trenching and the trench with the support media is back-filled with particular material to displace and remove the support media from the trench, the improvement comprising employing of said support media a hydrated crosslinked copolymer of acrylic acid.

* * * * *